Patented Aug. 12, 1924.

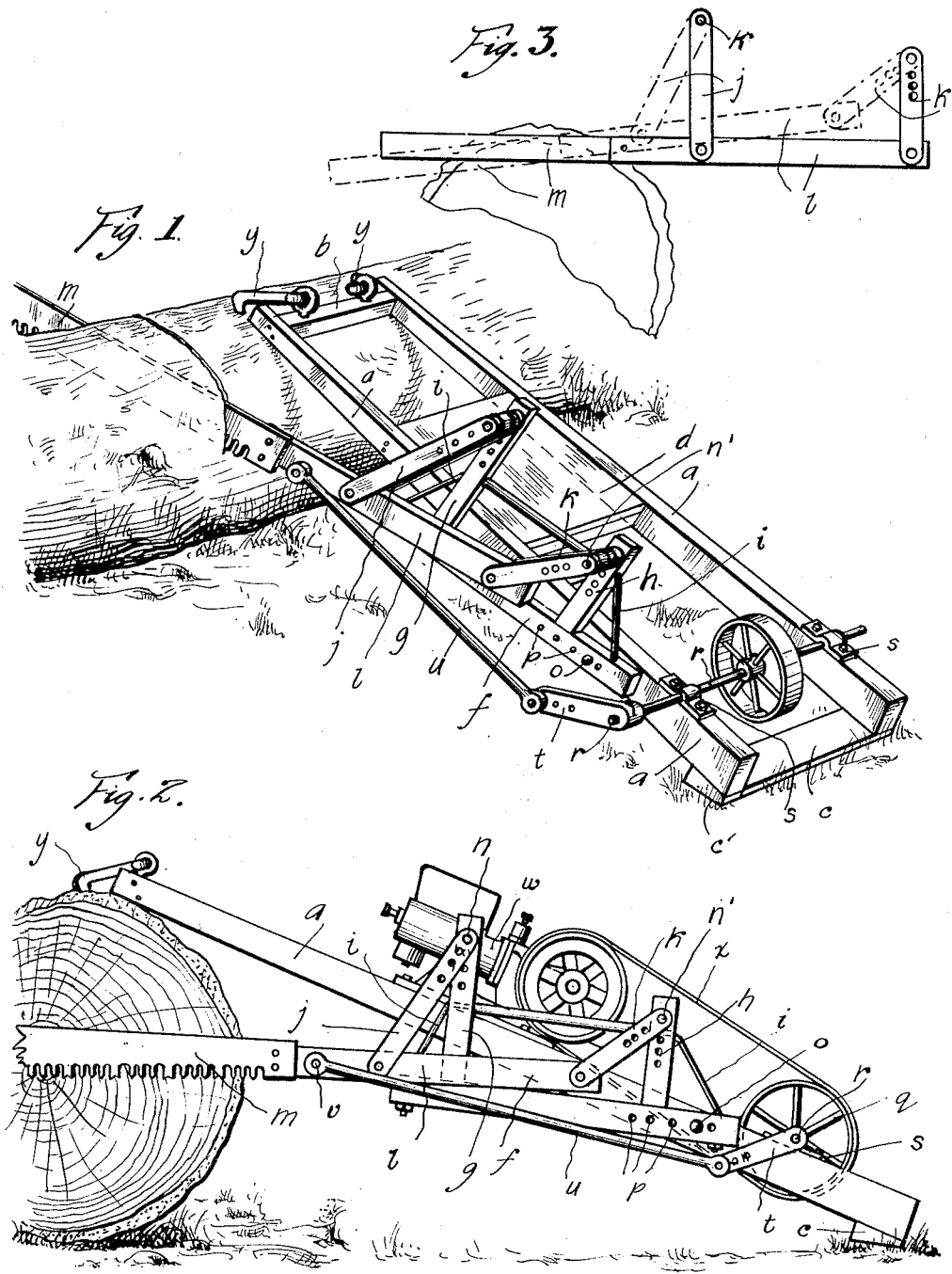

1,505,030

UNITED STATES PATENT OFFICE.

GEORGE F. KENTCH, OF CLATSKANIE, OREGON.

DRAG SAW.

Application filed July 13, 1922. Serial No. 574,677.

*To all whom it may concern:*

Be it known that I, GEORGE F. KENTCH, a citizen of the United States, and a resident of Clatskanie, county of Columbia, and State of Oregon, have invented a certain new and useful Improvement in Drag Saws, of which the following is a specification.

The object of my invention is to provide inexpensive, efficient devices in portable saws which will impart to the saw an arcuate path of action, thereby simulating the motion usually imparted to a cross cut saw when operated by hand.

A further object is to provide devices which will reduce the angularity of the pitman with the path of reciprocation of the saw blade.

These and other objects are accomplished in a device consisting of a main frame, an auxiliary frame pivoted at one end on the main frame for rotation in a vertical plane, the auxiliary frame comprising a member provided with upright members, a brace element tying and bracing the upright members on the longitudinal member, a pivot projecting laterally from the upper ends of each of said upright members, an arm pendent from each of said pivots, the arms being of unequal length and being adjustable on their pivots thereby to make them relatively longer or shorter, a saw carrying arm pivotally suspended from said pendent arms, a prime mover mounted on said main frame and driving connections therefrom to the saw carrying arm, the connections including a crank element located at the end of the main frame farthest from the work, and a pitman of substantial length connecting the crank element to the saw carrying arm, at a point adjacent the end of the saw blade.

These features, and others, are shown in the accompanying drawings, in which:

Fig. 1 is a perspective view of the frame of my device and illustrates the relation of the parts in sawing position;

Fig. 2 is a side elevation of my device in sawing position with the engine in place on the frame; and Fig. 3 is a diagrammatic representation of the action of the saw blade and shows that the mechanism of this blade simulates the action of the saw when used manually.

The saw consists of a main frame made up of side pieces $a$ with a top brace $b$, a bottom brace $c$ and intermediate platform $d$. An auxiliary frame $f$ is pivotally attached to the outside of one or both sides of the frame. This auxiliary frame is made with upright pieces $g$ and $h$ fastened and braced by rods $i$. The upright piece $g$ is preferably longer than the piece $h$. A pendent link $j$ is pivotally attached to the upright piece $g$ and a pendent link $k$ to the piece $h$. The saw-carrying arm $l$ is pivotally fastened to both these links and to saw blade $m$ on its outermost end. It can be seen that the saw blade will thus be swung from two points and if the links are equal will move always in a parallel path. If the links $j$ and $k$ are of different length, however, there will be a slight tip on both sides of vertical position, and thus the blade will move in an arcuate path. It is proposed that the link $j$ be slightly longer than the link $k$ so as to give this tip as shown in Fig. 3.

The relative difference in length can be adjusted by placing the bolts $n$ and $n'$ thru different sets of holes in the upright members $g$ and $h$ and the links $j$ and $k$. It is to be remembered that the pieces $f$, $g$ and $h$ are fastened rigidly together and the whole auxiliary frame $f$ is hinged to one of the side members $a$ by means of a bolt $o$. This arm also has different holes as $p$ so that the frame can be adjusted inwardly or outwardly by placing the shaft $o$ thru different holes.

A pulley $q$ is mounted on the shaft $r$ which is positioned transverse of the side members and is journaled thereon by the bearings $s$. This shaft is placed at the end of the main frame farthest from the work. A crank arm $t$ is fastened to one or both ends of the shaft $r$ and is connected with the pitman $u$. This pitman on its opposite end is connected to the arm $l$ and thus the rotation of the crank arm is transformed into reciprocating motion of the arm $l$. This pitman $u$ is of substantial length and is fastened directly from the crank $t$ to the arm $l$ immediately behind the end of the saw blade as at $v$ so that the force applied from the crank to the saw is always substantially parallel with the line of action of the saw. Thus the force transmitted thru the pitman does not tend to work against the weight of the frame or to bind the saw in the cut but substantially all of the force is transmitted into a reciprocating motion of the saw blade.

An engine or any other prime mover $w$ is connected to the pulley $q$ by the belt $x$.

This engine is bolted to the platform $d$ on the frame $a$ which forms a base for the same. Dogs $y$ are fastened to the upper cross piece $b$ so as to provide a means for rigidly holding the frame to the same during the cutting operation. The bottom cross piece $c$ is slightly beveled as at $c'$ so as to accommodate itself to the usual angle of the ground during the cutting operation. In my experiments I have found that this saw is capable of doing more work with a lesser expenditure of work than portable saws as now devised. This is because the weight of the saw is suspended wholly from the upright arms $g$ and $h$. These members being fastened to the member $f$ which is pivoted, permits the entire auxiliary frame to fall as the saw cuts thru the log. This in combination with the links of different lengths which cause the saw to cut at different angles thruout the stroke, allows the saw to pass thru the log with a minimum amount of expended work.

I claim:

1. In a saw of the character described, a main frame, an auxiliary frame pivoted at one end on said main frame for movement in a vertical plane, the auxiliary frame comprising a longitudinal member provided with upright members, a pivot projecting laterally from the upper end of each of said upright members, an arm pendent from each of said pivots, said arms being of unequal length, a saw-carrying arm pivotally suspended from said pendent arms, and a prime mover mounted on said main frame and driving connection therefrom to the saw carrying arm.

2. In a saw of the character described, a main frame, an auxiliary frame pivoted at one end on said main frame for movement in a vertical plane, the auxiliary frame comprising a longitudinal member provided with upright members, a pivot projecting laterally from the upper end of each of said upright members, an arm pendent from each of said pivots, said arms being adjustable on their pivots, thereby to make them of relatively different lengths, a saw-carrying arm pivotally suspended from said pendent arms, and a prime mover mounted on said main frame and driving connection therefrom to the saw carrying arm.

3. In a saw of the character described, a main frame, an auxiliary frame pivoted at one end on said main frame for moving in a vertical plane, the auxiliary frame comprising a longitudinal member provided with upright members, a pivot projecting laterally from the upper end of each of said upright members, an arm pendent from each of said pivots, said arms being of unequal length, a saw-carrying arm pivotally suspended from said pendent arms, a prime-mover mounted on said main frame and driving connection therefrom to the saw carrying arm, the main connection including a crank-element located at that end of the main-frame farthest from the work, and a pitman of substantial length between the crank-element and the saw-carrying arm, the pivotal point of the auxiliary frame being adjustable relatively to the limit of motion to be placed on the pendent arms.

4. In a saw of the character described, a main frame, a rigid auxiliary frame work pivoted on the main frame, spaced links of unequal length pivotally carried by said auxiliary frame work and a saw carrying arm pivotally suspended from said links, in combination with means provided on said main frame for reciprocating said saw carrying arm.

GEORGE F. KENTCH.